(12) United States Patent
Park et al.

(10) Patent No.: US 11,397,501 B2
(45) Date of Patent: Jul. 26, 2022

(54) COORDINATE MEASURING APPARATUS FOR MEASURING INPUT POSITION OF COORDINATE INDICATING APPARATUS, AND METHOD OF CONTROLLING THE SAME

(71) Applicant: Samsung Electronics Co., Ltd., Gyeonggi-do (KR)

(72) Inventors: Sung-Soo Park, Gyeonggi-do (KR); Gwan-Hyung Kim, Gyeonggi-do (KR); Byung-Jik Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/073,728

(22) Filed: Oct. 19, 2020

(65) Prior Publication Data

US 2021/0034181 A1 Feb. 4, 2021

Related U.S. Application Data

(63) Continuation of application No. 15/934,193, filed on Mar. 23, 2018, now Pat. No. 10,809,863, which is a (Continued)

(30) Foreign Application Priority Data

Jul. 4, 2013 (KR) .................. 10-2013-0078176

(51) Int. Cl.
*G06F 3/046* (2006.01)
*G06F 3/041* (2006.01)
*G06F 3/044* (2006.01)

(52) U.S. Cl.
CPC .............. *G06F 3/046* (2013.01); *G06F 3/044* (2013.01); *G06F 3/0416* (2013.01);
(Continued)

(58) Field of Classification Search
CPC ....................................................... G06F 3/046
(Continued)

(56) References Cited

U.S. PATENT DOCUMENTS 7,903,094 B2 3/2011 Katsuhito et al.
10,209,816 B2 2/2019 Park
(Continued)

FOREIGN PATENT DOCUMENTS

CN 103543944 1/2014
CN 103593099 2/2014
(Continued)

OTHER PUBLICATIONS

U.S. Office Action dated May 25, 2018 issued in counterpart U.S. Appl. No. 15/267,940, 14 pages.
(Continued)

*Primary Examiner* — Long D Pham
(74) *Attorney, Agent, or Firm* — The Farrell Law Firm, P.C.

(57) ABSTRACT

An apparatus and method are provided for controlling a coordinate measuring apparatus including a first touch panel that detects a contact of a portion of a human body and a contact of a coordinate indicating apparatus, and a second touch panel for detecting an electromagnetic signal from the coordinate indicating apparatus. The method includes determining a detection state of the coordinate indicating apparatus based on the electromagnetic signal detected by the second touch panel; and determining an activated area of the first touch panel based on the detection state of the coordinate indicating apparatus.

12 Claims, 12 Drawing Sheets

Related U.S. Application Data continuation of application No. 14/322,457, filed on Jul. 2, 2014, now Pat. No. 9,927,938.

(52) U.S. Cl.
CPC ........ *G06F 3/0442* (2019.05); *G06F 3/04166* (2019.05); *G06F 2203/04101* (2013.01); *G06F 2203/04106* (2013.01)

(58) Field of Classification Search
USPC .......................................................... 345/173
See application file for complete search history.

(56) References Cited

U.S. PATENT DOCUMENTS

| | | | |
|---|---|---|---|
| 2006/0109252 A1* | 5/2006 | Kolmykov-Zotov | ................. G06F 3/04186 345/173 |
| 2008/0042985 A1 | 2/2008 | Katsuhito et al. | |
| 2011/0310034 A1 | 12/2011 | Ouchi | |
| 2012/0007618 A1 | 1/2012 | Yeh | |
| 2012/0013555 A1 | 1/2012 | Maeda et al. | |
| 2012/0158629 A1* | 6/2012 | Hinckley | ............ G06F 3/04883 706/15 |
| 2012/0262407 A1 | 10/2012 | Hinckley et al. | |
| 2012/0313865 A1 | 12/2012 | Pearce | |
| 2013/0300672 A1 | 11/2013 | Griffin | |
| 2013/0321334 A1 | 12/2013 | Yoshida | |
| 2014/0022193 A1 | 1/2014 | Kim et al. | |
| 2014/0043283 A1 | 2/2014 | Kim | |
| 2014/0092045 A1 | 4/2014 | Ananthapadmanabh | |
| 2014/0111472 A1 | 4/2014 | Lee et al. | |
| 2015/0009161 A1 | 1/2015 | Park et al. | |
| 2015/0177870 A1 | 6/2015 | Nicholson et al. | |
| 2015/0363034 A1 | 12/2015 | Hinckley et al. | |

FOREIGN PATENT DOCUMENTS

| | | |
|---|---|---|
| EP | 2 325 736 | 5/2011 |
| JP | 2007-287118 | 11/2007 |
| JP | 2008-152640 | 7/2008 |
| KR | 20100053093 | 5/2011 |
| KR | 20120003766 | 1/2012 |
| KR | 20120044718 | 5/2012 |
| KR | 1020140144401 | 12/2014 |
| KR | 1020150005020 | 1/2015 |

OTHER PUBLICATIONS

International Search Report dated Dec. 7, 2016 issued in counterpart application No. PCT/KR2016/010352, 9 pages.

European Search Report dated Aug. 13, 2018 issued in counterpart application No. 16846882.5-1221, 8 pages.

U.S. Office Action dated Nov. 15, 2019 issued in counterpart U.S. Appl. No. 16/255,426, 19 pages.

Korean Office Action dated Dec. 11, 2019 issued in counterpart application No. 10-2013-0078176, 18 pages.

Chinese Office Action dated Aug. 26, 2020 issued in counterpart application No. 201680053639.3, 24 pages.

Korean Office Action dated Apr. 1, 2022 issued in counterpart application No. 10-2016-0093257, 11 pages.

* cited by examiner

COORDINATE MEASURING APPARATUS FOR MEASURING INPUT POSITION OF COORDINATE INDICATING APPARATUS, AND METHOD OF CONTROLLING THE SAME

PRIORITY

This application is a continuation application of U.S. patent application Ser. No. 15/934,193, which was filed on Mar. 23, 2018, which is a continuation application of U.S. patent application Ser. No. 14/322,457, which was filed on Jul. 2, 2014 and issued as U.S. Pat. No. 9,927,938 on Mar. 27, 2018, and claims priority under 35 U.S.C. § 119(a) to Korean Application Serial No. 10-2013-0078176, which was filed in the Korean Intellectual Property Office on Jul. 4, 2013, the entire content of each of which is hereby incorporated by reference.

BACKGROUND

1. Field of the Invention

The present invention relates generally to a coordinate measuring apparatus for measuring an input position of a coordinate indicating apparatus, such as a finger or a stylus pen, and a method of manufacturing the same.

2. Description of the Related Art

In recent years, smart phones or tablet Personal Computers (PCs) have increased in popularity. A smart phone or a tablet PC mainly includes a touch screen, through which a user may enter an input at a specific coordinate by using a finger or a stylus pen.

The touch screen may operate using electrical methods, infrared methods, ultrasonic methods, etc. Examples of the electrical methods may include a Resistance (R) type touch screen and a Capacitive (C) type touch screen.

To date, R type touch screens, which recognize both a finger of a user and a stylus pen, are more commonly used, but the R type touch screens often have a problem caused by reflection due to a layer of air between transparent conducting film layers, for example, Indium Tin Oxide (ITO) layers. That is, transmittance of light transmitted from a display is lowered by a layer of air between ITO layers, and light reflection on a screen increases.

Accordingly, the use of C type touch screens has recently increased. The C type touch screens detect a difference between electrostatic capacities of a transparent electrode generated by a contact of an object. However, because it is difficult for the C type touch screens to physically distinguish a hand from a pen, the C type touch screens often generate operation errors due to an unintended contact of a hand during use thereof.

To address some of the drawbacks of the R and C type touch screens, Electro Magnetic Resonance (EMR) has been used, by including a separate coordinate measuring apparatus in addition to a C type touch screen.

For example, some recent smart phones or tablet PCs include both a C type panel and an EMR type panel. These smart phones or tablet PCs can detect inputs of both a portion of a body of a user and a stylus pen, in which case a C type panel can detect, for example, an input by a portion of a body of a user, e.g., a finger, and an EMR type panel can detect an input by another device, such as a stylus pen. However, when a user inputs an instruction to a smart phone or tablet PC while holding a stylus pen, a portion of a hand of the user often contacts the touch screen. Accordingly, the C type panel may still recognize the portion of the hand of the user as an instruction for touching a specific object, and thus an error will still occur.

SUMMARY

Accordingly, the present invention has been made to solve at least the above-described problems occurring in the prior art, and to provide at least the following advantages.

An aspect of the present invention is to provide a coordinate measuring apparatus and method for correctly measuring an input position of a coordinate indicating apparatus, by activating only a portion of a C type panel, when a signal by a pen is detected.

In accordance with an aspect of the present invention, a touch sensor is provided for detecting a contact position of a human body and a coordinate-indicating apparatus, the touch sensor including first detecting circuitry capable of detecting a contact position of a portion of the human body; second detecting circuitry capable of detecting a contact position of the coordinate-indicating apparatus; and a controller configured to identify, through the second detecting circuitry, an electromagnetic signal provided by the coordinate-indicating apparatus, and identify a detecting area based on the electromagnetic signal, with at least part of the touch sensor corresponding to the detecting area being activated and remaining parts of the touch sensor other than the at least part of the detecting area being deactivated.

In accordance with another aspect of the present invention, a touch sensor for detecting a contact position of a human body and a coordinate-indicating apparatus is provided, the touch sensor including first detecting circuitry, second detecting circuitry and a controller configured to identify, through the second detecting circuitry, an electromagnetic signal provided by the coordinate-indicating apparatus, identify a location of the coordinate-indicating apparatus based on the electromagnetic signal, and identify a detecting area of the first detecting circuitry based on the location of the coordinate-indicating apparatus, with the controller configured to identify a signal output from the detecting area as being generated by a touch intended by a user and identify a signal output from a remaining area of the first detecting circuitry other than the detecting area as being generated by a touch unintended by the user.

In accordance with a further aspect of the present invention, a method is provided for controlling a touch sensor including first detecting circuitry capable of detecting a contact position of a portion of a human body and second detecting circuitry capable of detecting a contact position of an coordinate-indicating apparatus, with the method including identifying, through the second detecting circuitry, an electromagnetic signal provided by the coordinate-indicating apparatus and identifying a detecting area based on the electromagnetic signal, with at least part of the touch sensor corresponding to the detecting area is activated and remaining parts of the touch sensor other than the at least part of the detecting area are deactivated.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
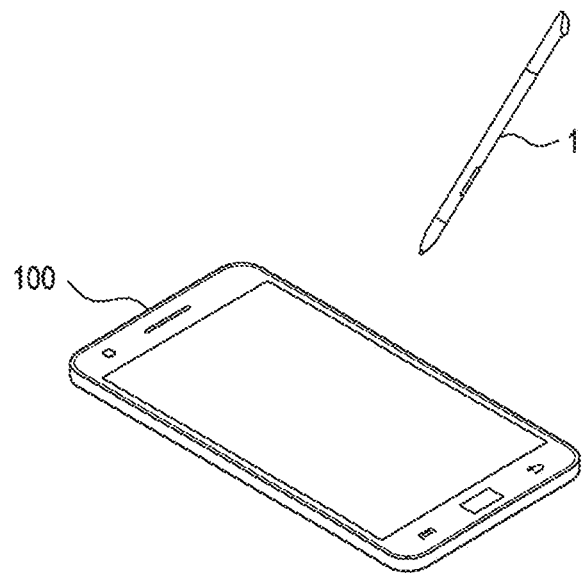
FIG. 1 illustrates a coordinate indicating system according to an embodiment of the present invention.

Hereinafter, various embodiments of the present invention will be described more specifically with reference to the accompanying drawings. It should be noted that the same components of the drawings are designated by the same reference numeral anywhere. In the following description of the present disclosure, a detailed description of known functions and configurations incorporated herein will be omitted when it may make the subject matter of the present disclosure rather unclear.

FIG. 1 illustrates a coordinate indicating system according to an embodiment of the present invention.

Referring to FIG. 1, a coordinate measuring apparatus 100 may detect an input of a coordinate indicating apparatus 1, e.g., a stylus pen, or a portion of a body of a user such as a finger, and measure a coordinate of an input position.

Although FIG. 1 illustrates the coordinate measuring apparatus 100 as a smart phone or a tablet PC, the type of the coordinate measuring apparatus 100 is not particularly limited thereto. For example, the coordinate measuring apparatus 100 may be a device for measuring a coordinate, such as a digitizer, a C type ITO electrode, or a display device, which will be described below in more detail without limitation.

The coordinate indicating apparatus 1 may contact the coordinate measuring apparatus 100 to designate a specific coordinate of the coordinate measuring apparatus 100. The coordinate indicating apparatus 1 may have a relatively small contact tip as compared with that of a fingertip.

The coordinate measuring apparatus 100 may determine whether a touch is generated by the coordinate indicating apparatus 1 or by a finger. That is, the coordinate measuring apparatus 100 may distinguish a type of a contact object. Herein, the contact object may be a conductive object such as a finger or a stylus pen which distinguishable from the conductive object.

First, the coordinate measuring apparatus 100 may measure an input position of the contact object, e.g., according to a change in capacitance due to a contact by the contact object. The measurement of a coordinate due to a change in capacitance will be described in more detail. Accordingly, the coordinate measuring apparatus 100 may measure both a coordinate of a finger and a coordinate of the coordinate indicating apparatus 1.

For example, the coordinate measuring apparatus 100 may include a digitizer (not shown) that may include at least one loop, which transmits an electromagnetic transmission signal (hereinafter, a Tx signal) to the coordinate indicating apparatus 1 based on a preset timing schedule.

For example, the coordinate indicating apparatus 1 may include a resonance circuit, which outputs the received Tx signal. The signal output from the coordinate indicating apparatus 1 is often referred to as an electromagnetic reception signal (hereinafter, referred to as a Reception (Rx) signal).

The at least one loop receives the Rx signal from the coordinate indicating apparatus 1, and determines an input position of the coordinate indicating apparatus 1 based on an intensity of the received Rx signal. For example, the coordinate measuring apparatus 100 may interpolate the intensities of Rx signals input to the loops, and may determine an input position of the coordinate indicating apparatus 1 based on the interpolation result.

The coordinate measuring apparatus 100 may also include a touch screen panel, e.g., a C type touch screen panel, which may detect a change in capacitance according to a physical input of a finger or the coordinate indicating apparatus 1. The touch screen panel may determine an input position based on the detected change in capacitance.

The coordinate measuring apparatus 100 may also include a display unit for processing a display signal and providing visual data to a user.

Figure 2:
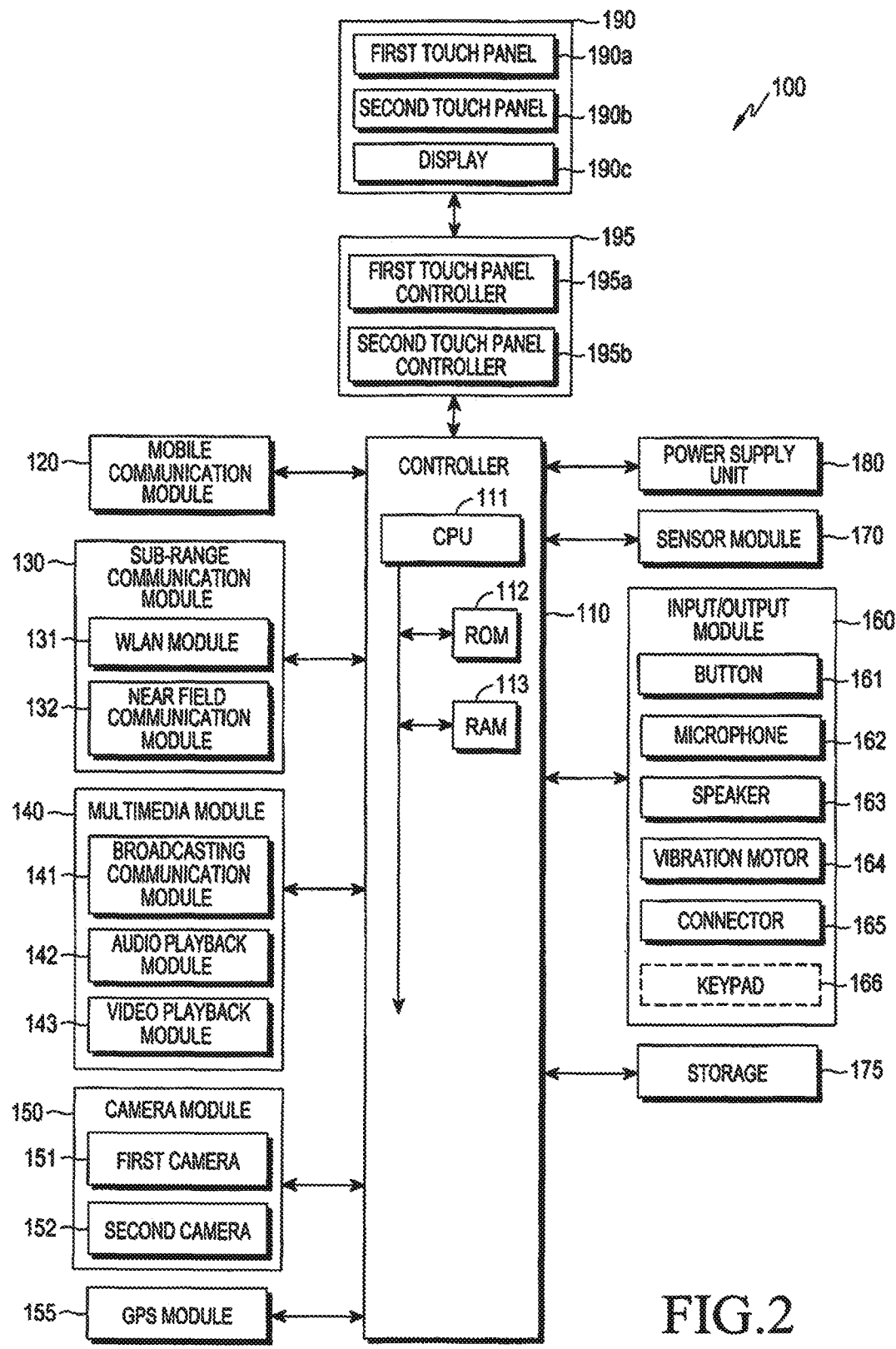
FIG. 2 is a block diagram illustrating a coordinate measuring apparatus according to an embodiment of the present invention.

FIG. 2 is a block diagram illustrating a coordinate measuring apparatus according to an embodiment of the present invention.

Referring to FIG. 2, a coordinate measuring apparatus 100 may be connected to an external device by using a mobile communication module 120, a sub communication module 130, and a connector 165. Examples of the external device include a mobile phone, a smart phone, a tablet PC, a server, etc.

The coordinate measuring apparatus 100 includes a touch screen 190, a touch screen controller 195, a controller 110, a mobile communication module 120, a sub-range communication module 130, a multimedia module 140, a camera module 150, a Global Positioning System (GPS) module 155, an input/output module 160, a sensor module 170, a storage unit 175, and a power supply 180. The sub-range communication module 130 includes a Wireless Local Area Network (WLAN) module 131 and a short range communication module 132, e.g., a Near Field Communication (NFC) module. The multimedia module 140 includes a broadcasting communication module 141, an audio playback module 142, and a video playback module 143. The camera module 150 includes a first camera 151 and a second camera 152, and the input/output module 160 includes a button 161, a microphone 162, a speaker 163, a vibration motor 164, a connector 165, and a keypad 166.

The controller 110 may include a Central Processing Unit (CPU) 111, a Read Only Memory (ROM) 112 that stores a control program for controlling the coordinate measuring apparatus 100, and a Random Access Memory (RAM) 113 that stores signals or data input from the outside of the coordinate measuring apparatus 100, or is used as a storage region for operations performed by the coordinate measuring apparatus 100. For example, the CPU 111 may include a single core, a dual core, a triple core, or a quad core. The CPU 111, the ROM 112, and the RAM 113 may be connected with each other through internal buses.

The controller 110 may control the mobile communication module 120, the sub-range communication module 130, the multimedia module 140, the camera module 150, the GPS module 155, the input/output module 160, the sensor module 170, the storage unit 175, the power supply unit 180, the touch screen 190, and the touch screen controller 195.

The mobile communication module 120 connects the external apparatus to the coordinate measuring apparatus 100 through mobile communication by using one or more antennas (not shown) under the control of the controller 110. The mobile communication module 120 transmits and receives radio signals for a voice call, a video call, a Short Message Service (SMS), or a Multimedia Message Service (MMS) to/from a portable phone, a smart phone, a tablet PC, or other devices that have telephone numbers or a network address input into the portable device 100.

Although FIG. 2 illustrates the sub-range communication module 130 may include the WLAN module 131 and the NFC module 132, alternatively, the sub-range communication module 130 may include only the WLAN module 131 or only the NFC module 132.

The WLAN module 131 may be connected to the Internet in a place in which a wireless Access Point (AP) is installed, under the control of the control unit 110. The WLAN module 131 supports a WLAN standard (IEEE802.11x) of the Institute of Electrical and Electronics Engineers (IEEE). The NFC module 132 may wirelessly perform short-range communication between the coordinate measuring device 100 and an image forming device under a control of the controller 110. Although FIG. 2 illustrates an NFC module 132, other short-range communication scheme may be used, such as Bluetooth and Infrared Data Association (IrDA) communication.

The coordinate measuring apparatus 100 may include at least one of the mobile communication module 120, the wireless LAN module 131 and the short-range communication module 132 according to its performance. For example, the coordinate measuring apparatus 100 may include a combination of the mobile communication module 120, the wireless LAN module 131 and the short-range communication module 132, according to its performance.

The multimedia module 140 may include the broadcasting communication module 141, the audio reproduction module 142 or the video reproduction module 143. The broadcasting communication module 141 may receive a broadcasting signal (e.g., a TV broadcasting signal, a radio broadcasting signal, or a data broadcasting signal) or broadcasting additional information (e.g., Electric Program Guide (EPS) or Electric Service Guide (ESG)), which is transmitted from a broadcasting station through a broadcasting communication antenna under the control of the controller 110. The audio playback module 142 may reproduce a stored or received digital audio file (e.g., a file of which the file extension is mp3, wma, ogg, or wav) under the control of the control unit 110. The video playback module 143 may reproduce a stored or received digital video file (e.g., a file having a file extension of mpeg, mpg, mp4, avi, mov, or mkv) under the control of the controller 110. The video playback module 143 may reproduce a digital audio file.

Although FIG. 2 illustrates the multimedia module 140 may include the audio playback module 142, the video playback module 143, and the broadcasting communication module 141, alternatively, at least one of the audio playback module 142, the video playback module 143, or the broadcasting communication module 141 may be included in multimedia module 140.

Alternatively, the multimedia module 140 may be included in the controller 100.

The first camera 151 and the second camera 152 photograph a still image or a moving image under the control of the controller 110. Further, the first camera 151 or the second camera 152 may include an auxiliary light source (e.g., a flash) that provides an amount of light required for photographing. For example, the first camera 151 is disposed on a front surface of the coordinate measuring apparatus 100, and the second camera 152 may be disposed on a rear surface of the coordinate measuring apparatus 100, or the first camera 151 and the second camera 152 are arranged adjacent to each other (e.g., an interval between the first camera 151 and the second camera 152 is larger than 1 cm or smaller than 8 cm) to photograph a 3D still image or a 3D moving image.

The GPS module 155 may receive radio waves from a plurality of GPS satellites and may calculate a position of the coordinate measuring apparatus 100.

In the input/output module 160, the buttons 161 may be disposed on a front surface, a side surface or a rear surface of a housing of the coordinate measuring device 100, and may include an electric power/lock button (not shown), a volume control button (not shown), a menu button, a home button, a back button, and a search button.

The microphone 162 receives a voice or a sound to generate an electrical signal under the control of the controller 110.

The speaker 163 may output sounds corresponding to various signals (for example, a wireless signal, a broadcasting signal, a digital audio file, a digital video file, photographing a picture or the like) of the mobile communication module 120, the sub-range communication module 130, the multimedia module 140, or the camera module 150 to an outside of the coordinate measuring device 100 under the control of the controller 110. The speaker 163 may output sounds (e.g., a button operation sound or a ringtone corresponding to a voice call) corresponding to functions which the coordinate measuring apparatus 100 performs. One speaker 163 or a plurality of speakers 163 may be formed on a suitable position or positions of the housing of the electronic device 100.

The vibration motor 164 may convert an electrical signal into a mechanical vibration under the control of the controller 110. For example, in a vibration mode, the portable device 100 operates the vibration motor 164 when receiving a voice call from another device. One vibration motor 164 or a plurality of vibration motors 164 may be formed within the housing of the coordinate measuring apparatus 100. The vibration motor 164 may also operate in response to a touch operation to provide tactile feedback.

The connector 165 may be used as an interface that interconnects the coordinate measuring apparatus 100 and an external apparatus or a power source. The coordinate measuring apparatus 100 may transmit data stored in the storage unit 175 of the coordinate measuring apparatus 100 to the external apparatus or receive data from the external apparatus through a wired cable connected to the connector 165 under the control of the control unit 110. The coordinate measuring apparatus 100 may receive electric power from a power source or charge a battery, through the wired cable connected to the connector 165.

The keypad 166 receives a key input from a user in order to control the coordinate measuring apparatus 100. The keypad 166 includes a physical keypad formed in the coordinate measuring apparatus 100 or a virtual keypad displayed on the touch screen 190. The physical keypad formed in the coordinate measuring apparatus 100 may be excluded according to a performance or structure of the coordinate measuring apparatus 100.

The sensor module 170 includes at least one sensor for detecting a status of the coordinate measuring apparatus 100. For example, the sensor module 170 may include a proximity sensor for detecting whether the user approaches the coordinate measuring apparatus 100, an illumination intensity sensor for detecting an amount of light around the coordinate measuring apparatus 100, or a motion sensor for detecting an operation of the coordinate measuring apparatus 100 (for example, a rotation of the coordinate measuring apparatus 100, or an acceleration or vibrations applied to the coordinate measuring apparatus 100). The sensors of the sensor module 170 may be added or omitted according to the performance of the coordinate measuring apparatus 100.

The storage unit 175 may store signals or data corresponding input/output to an operation of the mobile communication module 120, the sub-range communication module 130, the multimedia module 140, the camera module 150, the GPS module 155, the input/output module 160, the sensor module 170, and the touch screen 190 under the control of the controller 110. The storage unit 175 may store a control program for controlling the coordinate measuring apparatus 100 or the controller 110 and applications.

The term, "storage unit" may include the storage unit 175, the ROM 112 and the RAM 113 in the control unit 110, or a memory card (not shown), e.g., an SD card or a memory stick, mounted in the mobile apparatus 100. The storage unit may include a non-volatile memory, a volatile memory, a Hard Disk Drive (HDD), and a Solid State Drive (SSD).

The power supply 180 may supply power to one battery or a plurality of batteries arranged at the coordinate measuring apparatus 100 according to a control of the controller 110. The one or more batteries supply power to the coordinate measuring apparatus 100. Further, the power supply unit 180 may supply the coordinate measuring apparatus 100 with power input from an external power source through a wired cable connected to the connector 165.

The touch screen 190 may provide a user with a User Interface (UI) corresponding to various services (e.g., a voice call, data transmission, broadcasting, and photographing). The touch screen 190 may transmit an analog signal corresponding to at least one touch, which is input to the UI, to the touch screen controller 195. The touch screen 190 may receive at least one touch through a user's body part (e.g., fingers including a thumb) or a touchable input means (e.g., a stylus pen). Further, the screen 190 may receive successive movements of one touch among the at least one touch. The touch screen 190 may transmit an analog signal corresponding to a continuous movement of an input touch to the touch screen controller 195.

In addition, the touch is not limited to a touch between the touch screen 190 and a touch means, but includes a non-contact (for example, a case where an interval between the touch screen 190 and the user's body or the touch means is 1 mm or shorter). A distance of the non-contact input detected by the touch screen 190 may be changed according to the performance or the structure of the coordinate measuring apparatus 100.

For example, the touch screen 190 may include a first touch panel 190*a* and a second touch panel 190*b*. The first touch panel 190*a* may measure a touch or approach of a portion of the body of the user. For example, the first touch panel 190*a* may be realized in a resistive manner, a capacitive manner, an infrared manner, or an acoustic wave manner. Herein, the controller 110 may determine a signal for display control processing from detection signals of the first touch panel 190*a*.

The second touch panel 190*b* may measure a touch or approach of an apparatus such as a stylus pen, i.e., the coordinate indicating apparatus 1. For example, the second touch panel 190*b* utilizes an EMR method.

The display 190*c* may display an input image signal.

The touch screen controller 195 converts the analog signal received from the touch screen 190 to a digital signal (e.g., X and Y coordinates) and transmits the digital signal to the controller 110. The controller 110 may control the touch screen 195 by using the digital signal received from the touch screen controller 190.

Alternatively, the touch screen controller 195 may be included in the controller 110.

The touch screen controller 195 may include a first touch panel controller 195*a* for controlling the first touch panel 190*a* and a second touch panel controller 195*b* for controlling the second touch panel 190*b*.

Further, the controller 110 may detect various user inputs received through the camera module 150, the input/output module 160, and the sensor module 170. The user input may include various types of information input into the coordinate measuring apparatus 100, such as a gesture, a voice, a pupil action, a bio signal, etc., of the user in addition to the touch. The controller 110 may control an overall operation of the coordinate measuring apparatus 100 to perform a predetermined operation or function corresponding to a detected user input.

Figure 3:
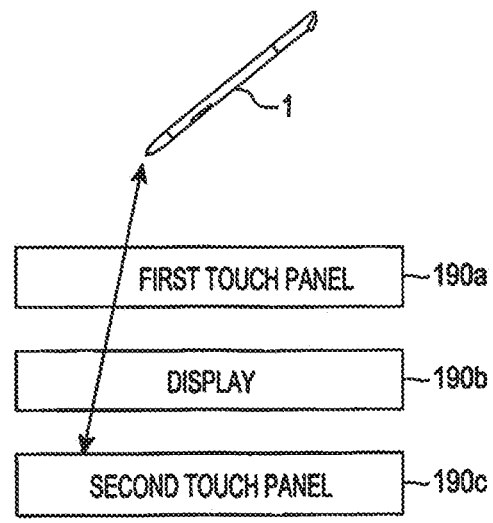
FIG. 3 is a side view illustrating a physical disposition of a first touch panel, a second touch panel, and a display, according to an embodiment of the present invention.

FIG. 3 is a side view illustrating a physical disposition of a first touch panel, a second touch panel, and a display, according to an embodiment of the present invention. Specifically, FIG. 3 illustrates the first touch panel 190*a*, the second touch panel 190*b*, and the display 190*c*.

Referring to FIG. 3, the display 190*c* may be disposed on the second touch panel 190*b*, and the first touch panel 190*a* may be disposed on the display 190*c*. The second touch panel 190*b* measures an electromagnetic signal received from the coordinate indicating apparatus 1 in order to measure an input point of the coordinate indicating apparatus 1. The first touch panel 190*a* may measure a change in capacitance at a point with which a finger of the user contacts. Because the first touch panel 190*a* may be realized, for example, by an ITO, a user may recognize an image output from the display 190*c*.

Figure 4:
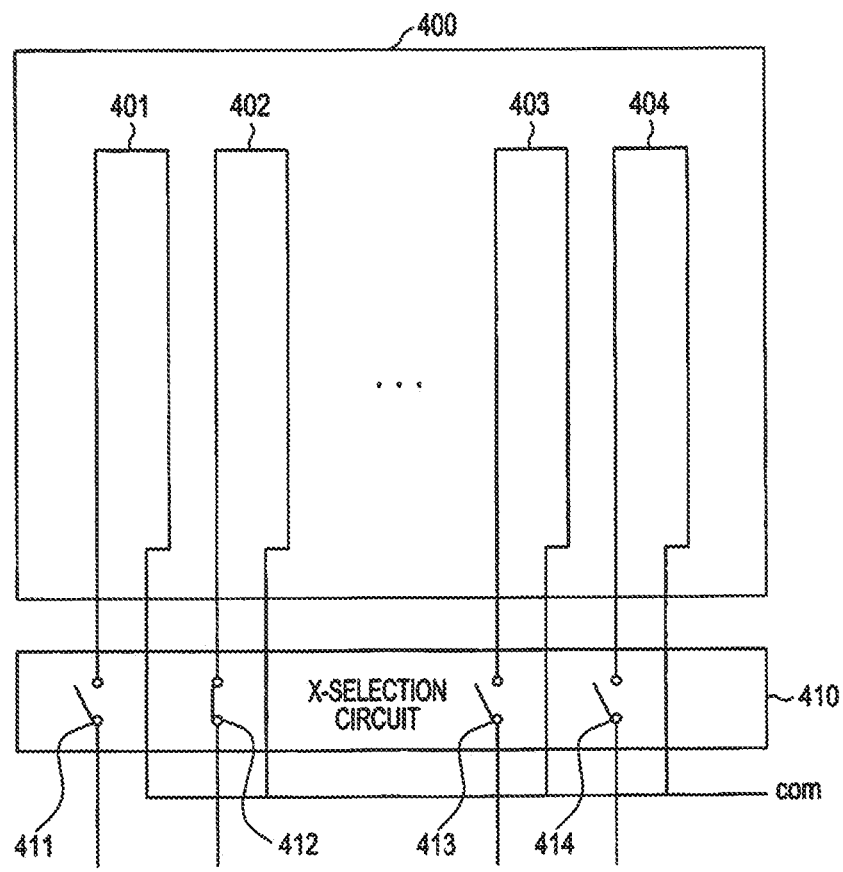
FIG. 4 illustrates a selection circuit and a loop according to an embodiment of the present invention.

FIG. 4 illustrates a selection circuit and a loop according to an embodiment of the present invention.

Referring to FIG. 4, the loop 400 may include a first loop 401, a second loop 402, a third loop 403, and a fourth loop 404. The first to fourth loops 401 to 404 may be disposed lengthwise in the y-axis direction. The first to fourth loops 401 to 404 may transmit an electromagnetic signal, i.e., a Transmission (Tx) signal, or may receive an electromagnetic signal, i.e., an Rx signal. First to fourth switches 411 to 414 may be connected to ends of the first to fourth loops 401 to 404. Opposite ends of the first to fourth loops 401 to 404 may be connected to a common terminal.

The controller 110 may control the first to fourth switches 411 to 414 of the selection circuit 410 to control connections of the first to fourth loops 401 to 404 to the controller 110. For example, the controller 110 may control such that the first switch 411 is in an on state for a first sub-period. That is, the controller 110 may control such that the first loop 401 is connected to the controller 110 for the first sub-period.

The controller 110 may control the second switch 412 such that the second loop 402 is connected to the controller 110 for a second sub-period, may control the third switch 413 such that the third loop 403 is connected to the controller 110 for a third sub-period, and may control the fourth switch 414 such that the fourth loop 404 is connected to the controller 110 for a fourth sub-period.

Figure 5A:
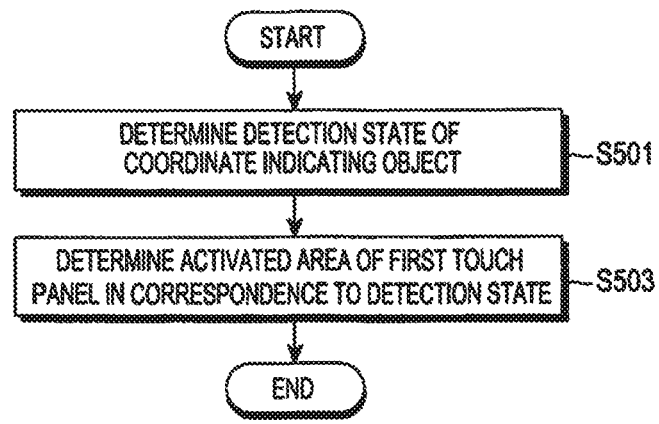
FIGS. 5A to 5D are flowcharts illustrating methods of controlling a coordinate measuring apparatus according to embodiments of the present invention.

FIG. 5A is a flowchart illustrating a method of controlling a coordinate measuring apparatus according to an embodiment of the present invention.

Referring to FIG. 5A, the coordinate measuring apparatus may determine a detection state of the coordinate indicating apparatus in step S501. For example, the coordinate measuring apparatus may determine whether an intensity of the Rx signal received from the coordinate indicating apparatus is a predetermined value or more. When the intensity of the Rx signal received from the coordinate indicating apparatus is a preset value or more, the coordinate measuring apparatus may determine that the coordinate indicating apparatus is detected. When the intensity of the Rx signal received from the coordinate indicating apparatus is less than a preset value, the coordinate measuring apparatus may determine that the coordinate indicating apparatus is not detected.

In step S503, the coordinate measuring apparatus may determine an active area of the first touch panel in correspondence to a detection state of the coordinate indicating apparatus. For example, if it is determined that the coordinate indicating apparatus is detected, the coordinate measuring apparatus may activate only a preset portion of the first touch panel. If it is determined that the coordinate indicating apparatus is not detected, the coordinate measuring apparatus may activate the entire area of the first touch panel.

As described above, the first touch panel may detect a touch by a portion of the body of a user, such as a finger. Therefore, when a coordinate measuring apparatus such as a pen is detected, the coordinate measuring apparatus activates only a portion of the first touch panel and deactivates the remaining portions so that an inadvertent touch by a portion of a human body may not be detected. Accordingly, even if the user holding a stylus pen makes an input with the stylus pen while a portion of a hand also contacts with the touch screen, a malfunction caused by the hand contact can be prevented.

Figure 5B:
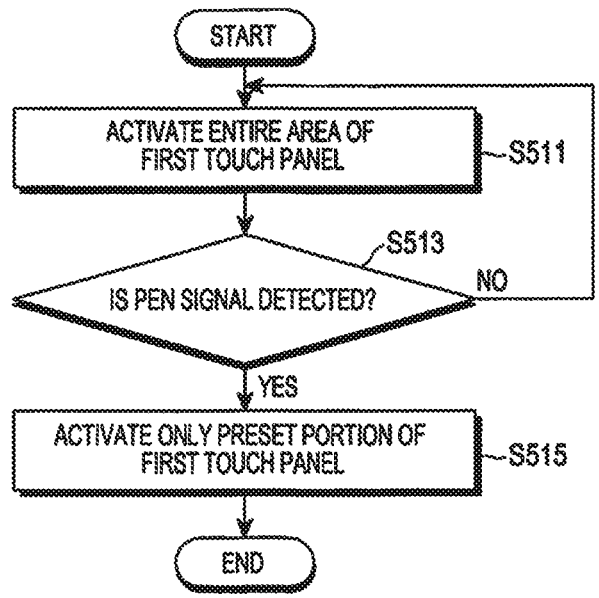

FIG. 5B is a flowchart illustrating a method of controlling a coordinate measuring apparatus according to an embodiment of the present invention. The control method of FIG. 5B will be described in detail with reference to FIGS. 6A to 6C, which illustrate coordinate measuring apparatuses according to embodiments of the present invention.

Figure 6A:
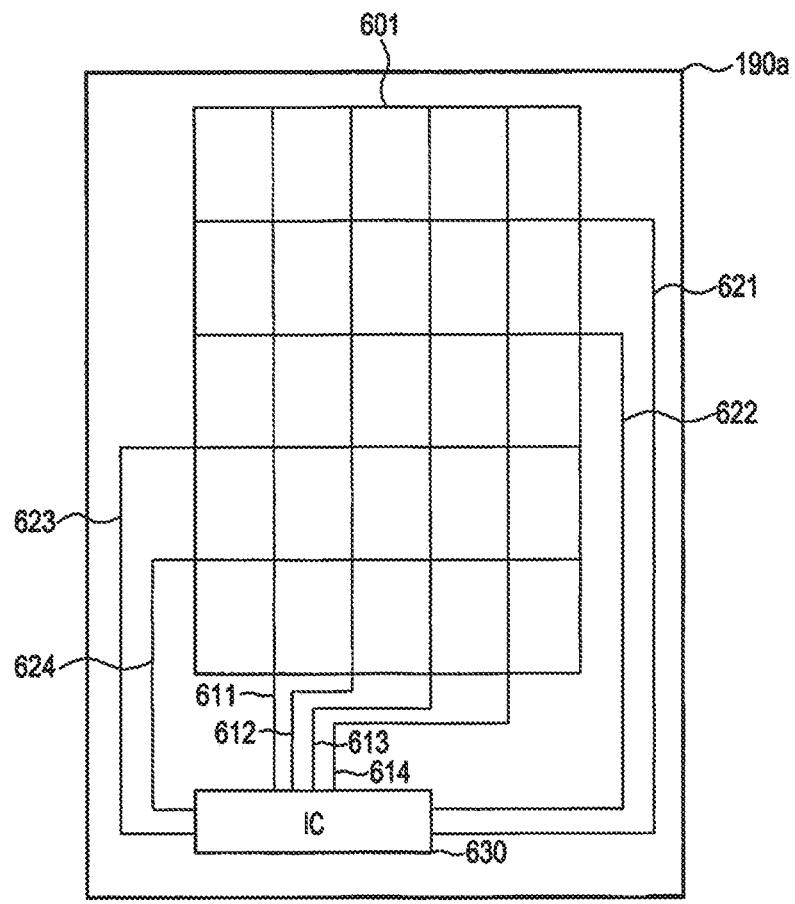
FIGS. 6A to 6C illustrate coordinate measuring apparatuses according to embodiments of the present invention.

Referring to FIG. 5B, the coordinate measuring apparatus may activate an entire area of a first touch panel in step S511. FIG. 6A illustrates a first panel of a coordinate measuring apparatus according to an embodiment of the present invention.

Referring to FIG. 6A, the first touch panel 190a may include an electrode part 601, x-axis electrode wires 611, 612, 613, and 614, y-axis electrode wires 621, 622, 623, and 624, and an Integrated Circuit (IC) 630.

The electrode part 601 may detect a touch of a portion of the body of the user. For example, a change in capacitance by a touch of a portion of the body of a user may be detected. The x-axis electrode wires 611, 612, 613, and 614 and the y-axis electrode wires 621, 622, 623, and 624 may output a signal input from the electrode part 601 to the IC 630. The IC 630 may determine a touch point of a portion of the body of the user based on signals received from the x-axis electrode wires 611, 612, 613, and 614 and the y-axis electrode wires 621, 622, 623, and 624.

As illustrated in FIG. 6A, in step S511 of FIG. 5B, the controller 110 may activate the entire area of the electrode part 601.

Figure 6B:
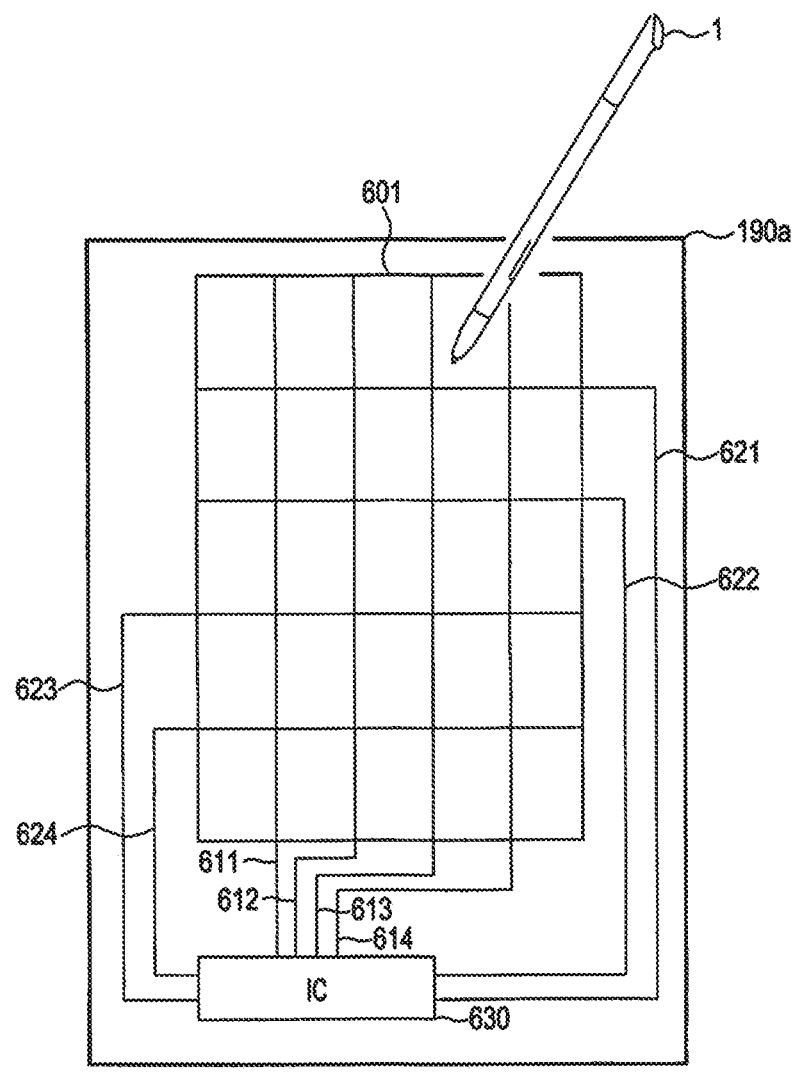

Referring back to FIG. 5B, the coordinate measuring apparatus may detect a pen signal in step S513. For example, as illustrated in FIG. 6B, the stylus pen 1 may approach the coordinate measuring apparatus. The second touch panel (not shown) may detect the stylus pen 1.

Figure 6C:
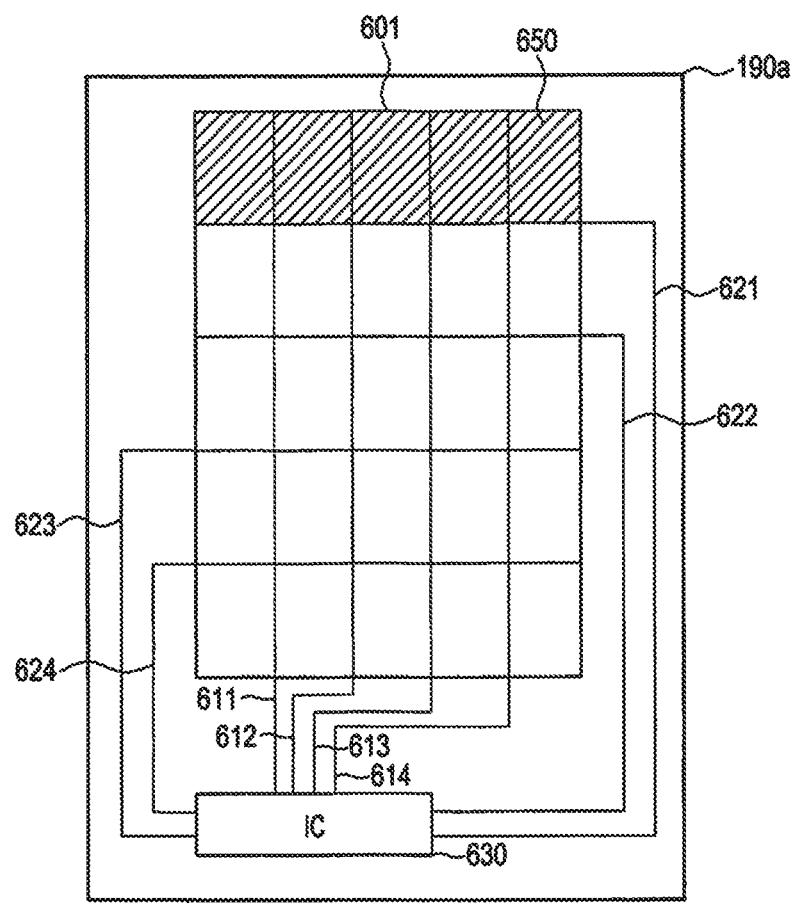

If it is determined that a pen signal is detected in step S513, the coordinate measuring apparatus may activate only a preset portion of the first touch panel in step S515. For example, as illustrated in FIG. 6C, the controller 110 may activate only an upper end portion 650 of the electrode part 601. Accordingly, even if a portion of the body of the user contacts the remaining portions of the electrode part 601, the IC 630 may not detect that contact. Accordingly, a malfunction by a portion of the body of the user can be prevented. In addition, the user may still input an edge flick from an upper side.

As illustrated in FIG. 6C, because the preset portion 650 of the electrode part 601 is activated, the edge flick from the upper side from the user may be detected.

Figure 5C:
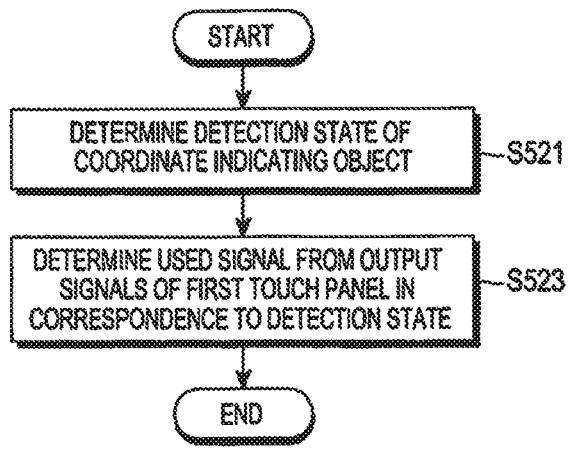

FIG. 5C is a flowchart illustrating a method of controlling a coordinate measuring apparatus according to an embodiment of the present invention.

Referring to FIG. 5C, the coordinate measuring apparatus may determine a detection state of the coordinate indicating apparatus in step S521. For example, the coordinate measuring apparatus may determine whether an intensity of the Rx signal received from the coordinate indicating apparatus is a predetermined value or more. When the intensity of the Rx signal received from the coordinate indicating apparatus is a preset value or more, the coordinate measuring apparatus may determine that the coordinate indicating apparatus is detected. When the intensity of the Rx signal received from the coordinate indicating apparatus is less than a preset value, the coordinate measuring apparatus may determine that the coordinate indicating apparatus is not detected.

In step S523, the coordinate measuring apparatus may determine a used signal from output signals of the first touch panel in correspondence to a detection state of the coordinate indicating apparatus. For example, if it is determined that the coordinate indicating apparatus is detected, the coordinate measuring apparatus may activate only a preset signal of the output signals of the first touch panel. If it is determined that the coordinate indicating apparatus is not detected, the coordinate measuring apparatus may use all signals of the first touch panel.

As described above, the first touch panel may detect a touch by a portion of the body of a user, such as a finger. When a coordinate measuring apparatus such as a pen is detected, the coordinate measuring apparatus uses only a preset signal of the output signals of the first touch panel and does not use the remaining portions, so that a touch by a portion of a human body may not be detected. Accordingly, even if the user holding a stylus pen makes an input with stylus pen while bringing a portion of a hand into contact with the touch screen, a malfunction due to hand contact can be prevented.

Figure 5D:
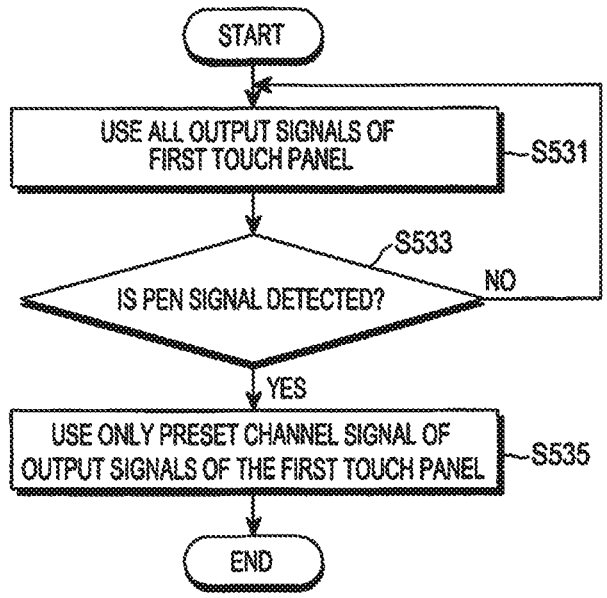

FIG. 5D is a flowchart illustrating a method of controlling a coordinate measuring apparatus according to an embodiment of the present invention. The control method of FIG. 5D will also be described in detail with reference to FIGS. 6A to 6C.

Referring to FIG. 5D, the coordinate measuring apparatus may use all signals output from the first touch panel in step S531. For example, as illustrated in FIG. 6A, the controller 110 may determine an input point of a portion of the body of the user by using all signals input from the x-axis electrode wires 611, 612, 613, and 614 and the y-axis electrode wires 621, 622, 623, and 624.

Referring back to FIG. 5D, the coordinate measuring apparatus may detect a pen signal in step S533. For example, as illustrated in FIG. 6B, the stylus pen 1 may approach the coordinate measuring apparatus, and the second touch panel (not shown) may detect the stylus pen 1.

If it is determined that a pen signal is detected in step S533, the coordinate measuring apparatus may activate only some signals of the signals output from the first touch panel in step S535.

For example, as illustrated in FIG. 6C, the controller 110 may use only a signal output from the present portion 650 of the electrode part 601. More specifically, the controller 110 may determine an input point of a portion of the body of the user by using only signals input from the x-axis electrode wires 611, 612, 613, and 614 and a signal input from the y-axis electrode wire 621. That is, the controller 110 does not use signals input from the y-axis electrode wires 622, 623, and 624. Accordingly, even if a portion of the body of the user contacts a portion corresponding to the y-axis electrode wires 622, 623, and 624, a malfunction due to this contact can be prevented.

Figure 7:
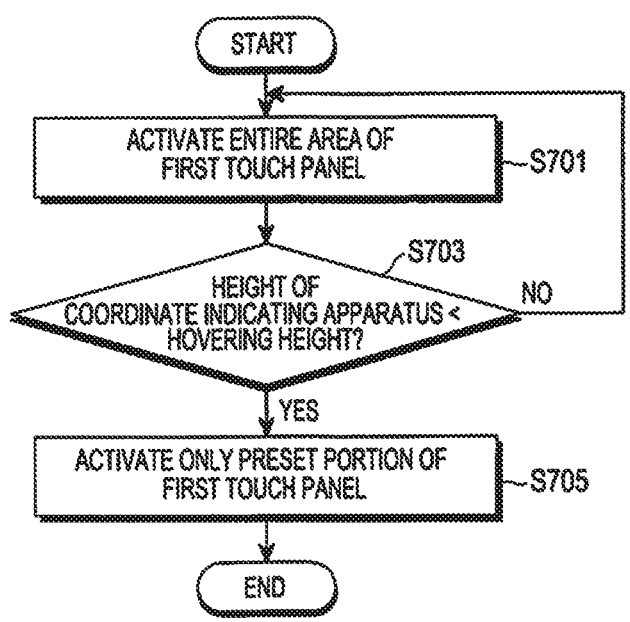
FIG. 7 is a flowchart illustrating a method of controlling a coordinate measuring apparatus according to an embodiment of the present invention.

FIG. 7 is a flowchart illustrating a method of controlling a coordinate measuring apparatus according to an embodiment of the present invention. Further, the control method illustrated in FIG. 7 will be described in detail with reference to FIGS. 8A and 8B, which illustrate coordinate measuring apparatus according to an embodiment of the present invention.

Referring to FIG. 7, the coordinate measuring apparatus may activate an entire area of the first touch panel in step S701. The coordinate measuring apparatus may determine whether a height of the coordinate indicating apparatus from the second touch panel is below a hovering height in step S703. If a height of the coordinate indicating apparatus from the second touch panel is above the hovering height in step S703, the coordinate measuring apparatus maintains activation of the entire area of the first touch panel in step S701.

Figure 8A:
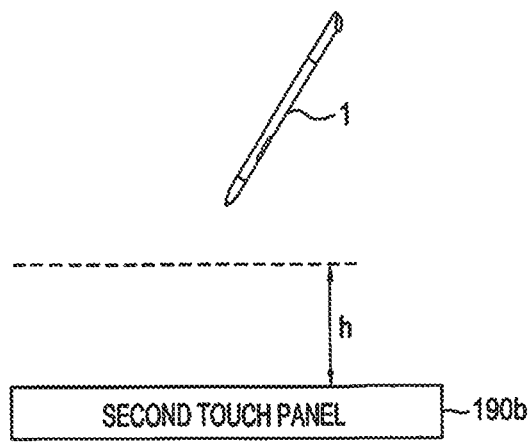
FIGS. 8A to 8B illustrate an operation of a coordinate measuring apparatus according to an embodiment of the present invention.

For example, as illustrated in FIG. 8A, when a distance between the second touch panel 190b and the coordinate indicating apparatus 1 is a greater than the hovering height h, the coordinate measuring apparatus maintains the activation of the entire area of the first touch panel. For example, whether a distance between the coordinate indicating apparatus 1 and the second touch panel 190b is lower than the hovering height h may be determined based on an intensity of the Rx signal input from the coordinate indicating apparatus 1 to the second touch panel 190b, e.g., if an intensity of the Rx signal input from the coordinate indicating apparatus 1 to the second touch panel 190b is greater than a preset threshold value.

Figure 8B:
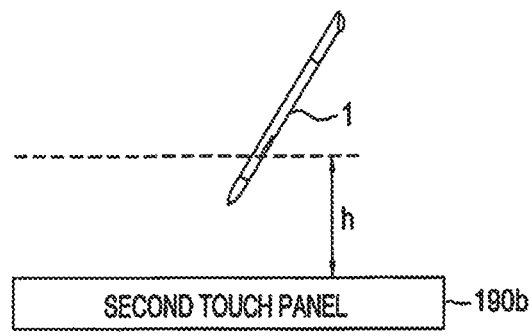

For example, when an intensity of the Rx signal input from the coordinate indicating apparatus 1 to the second touch panel 190b is less than or equal to a preset threshold value, the controller 110 may determine that the distance between the coordinate indicating apparatus 1 and the second touch panel 190b is greater than the hovering height h. However, when the intensity of the Rx signal input from the coordinate indicating apparatus 1 to the second touch panel 190b is greater than the preset threshold value, the controller 110 may determine that the distance between the coordinate indicating apparatus 1 and the second touch panel 190b is within the hovering height h, as illustrated in FIG. 8B.

If a height from the second touch panel of the coordinate indicating apparatus is lower than the hovering height in step S703, the coordinate measuring apparatus may activate only a preset portion of the first touch panel in step S715. For example, as illustrated in FIG. 8B, when a distance between the second touch panel 190b and the coordinate indicating apparatus 1 is less than the hovering height h, the coordinate measuring apparatus may activate only the preset portion of the first touch panel.

Basically, the coordinate measuring apparatus may determine an activated area of the first touch panel according to a distance of a coordinate indicating apparatus therefrom.

Figure 9A:
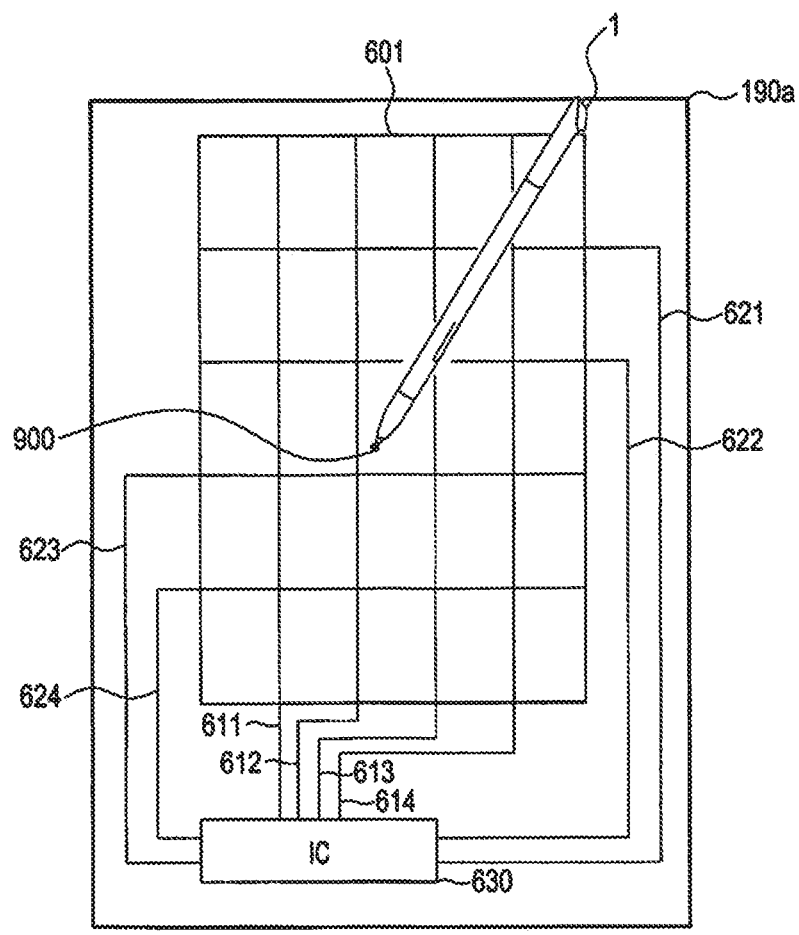
FIGS. 9A to 9B illustrate an operation of a coordinate measuring apparatus according to an embodiment of the present invention.
Figure 9B:
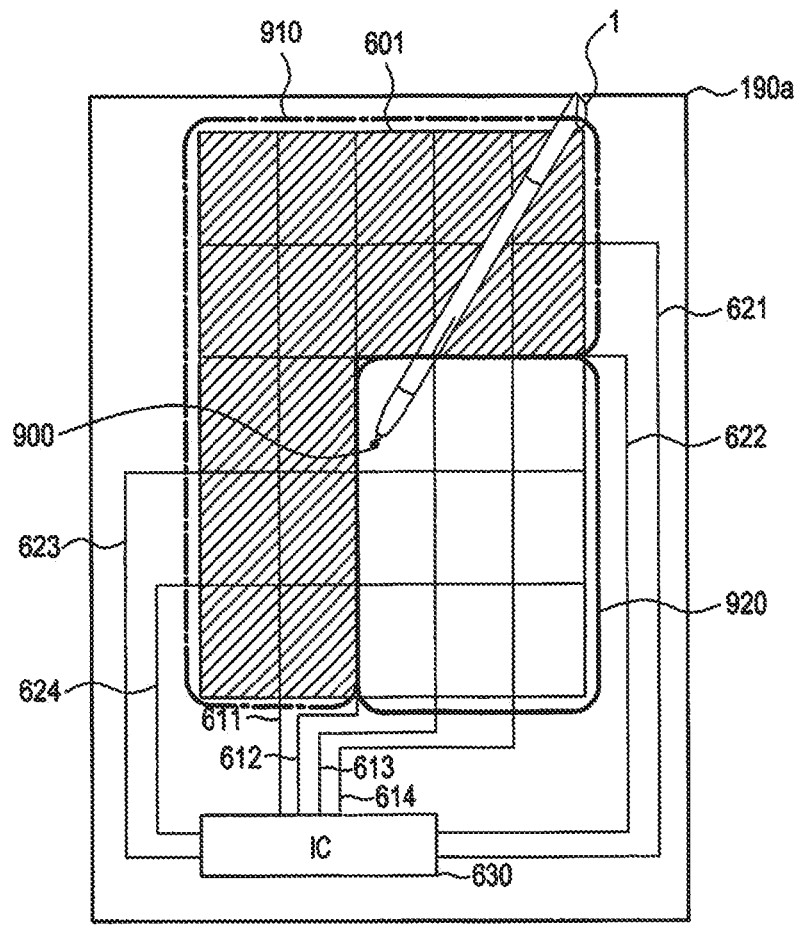

FIGS. 9A to 9B illustrate a coordinate measuring apparatus according to an embodiment of the present invention.

Referring to FIG. 9A, the coordinate indicating apparatus 1 may touch a first point 900 on the touch screen. At the same time, the user's hand may also touch the touch screen. For example, when the user holds the coordinate indicating apparatus 1 with the right hand, the right hand of the user may contact a portion of the touch screen within in a preset area of the first point 900. Therefore, to prevent an input being generating from the right hand contact, the controller 110 may determine a preset area 910 as an activated area, and a preset area 920 as a deactivated area, as illustrated in FIG. 9B.

Alternatively, the controller 110 use only signals output from the x-axis electrode wires 611 and 612 and the y-axis electrode wires 621 and 622, and may not use signals output from the x-axis electrode wires 613 and 614 and the y-axis electrode wires 623 and 624.

As described above, only a portion that a hand of a user may contact is deactivated to prevent a malfunction.

Further, deactivation of a portion within in a preset area of the first point 900 is simply exemplary, and a portion that a hand of a user may contact in relation to a portion that the coordinate indicating apparatus 1 contacts can be deactivated using various methods.

The above-described, various embodiments of the present invention provide different methods and coordinate measuring apparatuses for correctly measuring an input position of a coordinate indicating apparatus, by activating only a portion of a C type panel when a signal by a pen is detected. Accordingly, a malfunction can be prevented, even when a user's hand inadvertently contacts a touch screen while the user inputs an instruction to the touch screen using the pen. In addition, a touch by a hand can still be detected when a user touches a frequently used portion with the user's hand.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A touch sensor for detecting a contact position of a human body and a coordinate-indicating apparatus comprising:
   first detecting circuitry capable of detecting a contact position of a portion of the human body;
   second detecting circuitry capable of detecting a contact position of the coordinate-indicating apparatus; and
   a controller configured to:
   identify, through the second detecting circuitry, an electromagnetic signal provided by the coordinate-indicating apparatus, and based on the electromagnetic signal, identify a detecting area, activate at least part of the first detecting circuitry corresponding to the detecting area, and deactivate remaining parts of the first detecting circuitry other than the at least part of the first detecting circuitry, wherein the at least part of the first detecting circuitry is for detecting a contact of the human body, and wherein the remaining parts of the first detecting circuitry include the contact position of the coordinate-indicating apparatus.

2. The touch sensor of claim 1, wherein the controller is further configured to:

when the electromagnetic signal provided by the coordinate-indicating apparatus is not identified, activate an entire area of a touch screen of the first detecting circuitry; and when the electromagnetic signal provided by the coordinate-indicating apparatus is identified, activate a partial area of the touch screen of the first detecting circuitry.

3. The touch sensor of claim 1, wherein the controller is further configured to:

when the coordinate-indicating apparatus is located at or higher than a predetermined height, activate an entire area of a touch screen of the first detecting circuitry; and when the coordinate-indicating apparatus is located below the predetermined height, activate a partial area of the touch screen of the first detecting circuitry.

4. The touch sensor of claim 1, wherein the controller is further configured to activate an edge area in a specific direction of a touch screen of the first detecting circuitry.

5. A touch sensor for detecting a contact position of a human body and a coordinate-indicating apparatus comprising:

first detecting circuitry;
second detecting circuitry; and
a controller configured to:
identify, through the second detecting circuitry, an electromagnetic signal provided by the coordinate-indicating apparatus,
identify a location of the coordinate-indicating apparatus based on the electromagnetic signal, and
based on the location of the coordinate-indicating apparatus, identify a detecting area of the first detecting circuitry corresponding to at least part of the first detecting circuitry, wherein the detecting area of the first detecting circuitry is for detecting a contact not caused by the coordinate display device, wherein the controller is configured to identify a signal output from the detecting area as being generated by a touch intended by a user and identify a signal output from a remaining area of the first detecting circuitry other than the detecting area as being generated by a touch unintended by the user, and wherein the remaining area of the first detecting circuitry includes the contact position of the coordinate-indicating apparatus.

6. The touch sensor of claim 5, wherein the controller is further configured to:

when the electromagnetic signal provided by the coordinate-indicating apparatus is not identified, use all of the signals output from the first detecting circuitry in the display control processing; and when the electromagnetic signal provided by the coordinate-indicating apparatus is identified, use the signal output from the detecting area in the display control processing.

7. The touch sensor of claim 5, wherein the controller is further configured to:

when the coordinate-indicating apparatus is located at or higher than a predetermined height use all of the signals output from the first detecting circuitry in the display control processing; and when the coordinate-indicating apparatus is located below the predetermined height, use the signal output from the detecting area in the display control processing.

8. The touch sensor of claim 5, wherein the controller is further configured to use a signal output from an edge area in a specific direction of a touch screen in the display control processing.

9. A method of controlling a touch sensor including first detecting circuitry capable of detecting a contact position of a portion of a human body and second detecting circuitry capable of detecting a contact position of a coordinate-indicating apparatus, the method comprising:

identifying, through the second detecting circuitry, an electromagnetic signal provided by the coordinate-indicating apparatus; and based on the electromagnetic signal, identifying a detecting area, activating at least part of the first detecting circuitry corresponding to the detecting area is activated, and deactivating remaining parts of the first detecting circuitry other than the at least part of the first detecting circuitry, wherein the at least part of the first detecting circuitry is for detecting a contact of the human body, and wherein the remaining parts of the first detecting circuitry include the contact position of the coordinate-indicating apparatus.

10. The method of claim 9, wherein identifying the detecting area comprises:

when the electromagnetic signal provided by the coordinate-indicating apparatus is not identified, activating an entire area of a touch screen; and when the electromagnetic signal provided by the coordinate-indicating apparatus is identified, activating a partial area of the touch screen.

11. The method of claim 9, wherein identifying the activated area of the first detecting circuitry comprises:

when the coordinate-indicating apparatus is located at or higher than a predetermined height, activating an entire area of a touch screen; and when the coordinate-indicating apparatus is located below the predetermined height, activating a partial area of the touch screen.

12. The method of claim 9, further comprising:
activating an edge area in a specific direction of the touch screen.

* * * * *